March 23, 1943.　　C. A. COMPTON　　2,314,771
HEAD REST
Filed Oct. 10, 1941
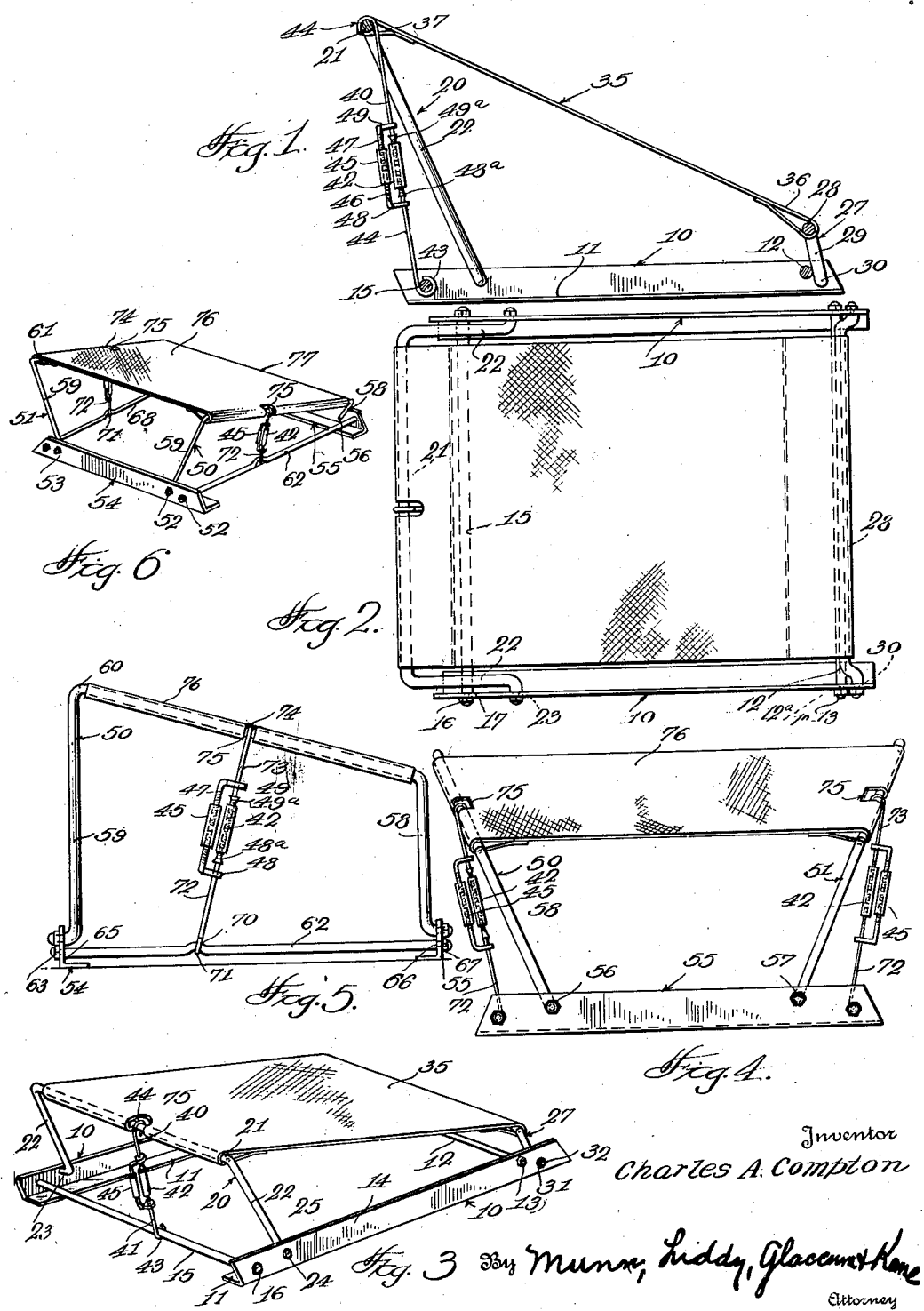
Inventor
Charles A. Compton
By Munn, Liddy, Glaccum & Kane
Attorney Patented Mar. 23, 1943

2,314,771

UNITED STATES PATENT OFFICE 2,314,771

HEADREST

Charles A. Compton, Washington, D. C.

Application October 10, 1941, Serial No. 414,529

3 Claims. (Cl. 5—337)

This invention relates to a head-rest.

An object of the invention is the provision of a head-rest which may be folded into a small flat package for convenient transportation, said package having a minimum of weight and bulk with the parts forming the rest being also reduced to a minimum for simplicity and ease of operation.

Another object of the invention is the provision of a head-rest which may be readily assembled by the setting of a few parts for maintaining a canvas or other fabricated material taut to receive and support the head of a person, the head-rest being capable of being readily disassembled and confined to a small package which may be placed in a soldier's kit.

A further object of the invention is the provision of a head-rest or a support for the body of a person which may be readily collapsed by the simple expedient of loosening a turnbuckle connection between the several parts of the device, the support including a base member, pivoted frames and a strip of canvas with means for maintaining the frames in spaced relation with the canvas or other material which is connected to the frames being maintained taut by the turnbuckle connection between one of the frames and the base member.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a vertical longitudinal section of the support.

Figure 2 is a plan view of the same.

Figure 3 is a view in perspective of the support.

Figure 4 is a front view in elevation of the modified form of the support.

Figure 5 is a side view of the modified form.

Figure 6 is a view in perspective of the modified form of the support.

Referring more particularly to Figs. 1 to 3 inclusive, it will be seen that a pair of angle iron base members 10 are located in spaced relation with one of the flanges 11 resting upon the ground or floor.

A rod 12 has its opposite threaded ends projecting through openings in the base members 10 adjacent one end of said base members and a cap nut 13 is threaded on the outer projecting ends for securing the rods rigidly to the flanges 14 of the base members 10. The rods 12 at the inner faces of the flanges 14 are provided with a shoulder 12a so that when the nuts 13 are screwed up tight the base members and the rod will be rigidly secured together. A second rod 15 has threaded ends passing through openings in the other ends of the flanges 14 of the base members 10 and cap nuts 16 are screwed onto the outer projecting ends of said rod for rigidly securing said rod to the base members. Said rod at the inner face of the flanges 14 may be provided with shoulders 17 so that the nuts 16 may clamp the flanges 14 of the base members rigidly to the opposite ends of the rod 15.

A U-shaped frame generally designated by the numeral 20 has a bight portion 21 and depending legs 22. At the end of the legs are provided pintles 23 which pass through bearings 24 formed in the flanges 14 of the base member and these bearings are located adjacent the rod 15, but spaced inwardly therefrom. These bearings are also located in a higher horizontal plane than the plane through which the rod 15 is located. Cap nuts 25 are threaded onto the outer ends of the pintles 23 for preventing the pintles from becoming disengaged from the bearings 24.

A second U-shaped frame generally designated by the numeral 27 has a bight portion 28 and depending legs 29 which have pintles 30 passing through bearings 31 in the ends of the base member adjacent the ends of the rod 12 but slightly outwardly from the ends of said rod and at a lower plane. Cap nuts 32 are screwed onto the ends of the pintles 30 for maintaining the pintles in position. It will be noted from Fig. 1 that since the pintles 30 are located below the horizontal level of the rod 12 and adjacent thereto the legs 29 of the U-shaped frame 27 will lean towards the rod and engage the same for maintaining the frame 27 in an elevated position.

A strip of canvas or other fabricated material 35 is provided with hems or loops 36 and 37 at its opposite ends to receive the respective bight portion 28 of the frame 27 and the bight portion 21 of the frame 20. Since the legs 29 of the frame 27 are considerably shorter than the legs 22 of the frame 20 the material 35 will be inclined at an angle to the horizontal and this inclination is such that when a person is resting his head upon the material his head will be maintained in a comfortable position. Furthermore, the bight portion 28 of the frame 27 is lowered sufficiently so that said bight portion will not engage the neck of the person resting his head upon the taut material 35.

A pair of rods 40 and 41 are joined together by a turnbuckle 42 at their inner alined threaded ends. The rod 41 is provided with a hook 43 which receives the bar 15 while a hook 44 on the outer end of the rod 40 receives the bight portion 21 of the frame 20. When the turnbuckle 42 is revolved in the proper direction, the rods 40 and 41 will be drawn toward each other thereby exerting a pull between the rod 15 and the bight portion 21 of the frame 20. This pull tends to force the bight portion 21 outwardly so that the material 35 will be drawn taut.

A second turnbuckle 45 connects the ends of a pair of rods 46 and 47 together. The rod 46 is provided with a lateral bearing 48 which receives the inner end of the rod 41. The rod 48 is provided with a lateral bearing 49 which receives the rod 40. The rod 41 is provided with a shoulder 48a located between the bearing 48 and the adjacent end of the turnbuckle 42. The rod 40 is provided with a shoulder 49a located between the bearing 49 and the adjacent end of the turnbuckle 42. The turnbuckle 45 when properly rotated will maintain the bearings 48, 49 in close association with the respective shoulders 48a and 49a and these bearings in connection with the shoulders will prevent the rods 41 and 40 from being unscrewed entirely from the sleeve 42. However, the shoulders and the position of the bearings 48, 49 will be such that the turnbuckle 42 may be adjusted to permit the hooks 43 on the rod 41 to be released from the rod 15.

When it is desired to collapse the head rest or support it is only necessary to properly operate the turnbuckle 42 so that the hook on the end of the rod 41 may be released from the rod 15. After this the frame 22 may be moved inwardly in the direction indicated by the arrow in Fig. 1 until it will fall upon the flanges 11 of the base members 10. The material 35 after the frame 29 is swung outwardly in the same direction as the frame 22, can be laid flat between the base members 10. Thus it will be seen that all of the parts can be laid flat between the base members 10 to provide an extremely small package for transportation.

On the other hand, when it is desired to erect the support it is only necessary to swing the frames 20 and 27 in the opposite direction and to their elevated positions as shown in Fig. 1. The hook 43 of the rod 41 is engaged over the bar 15. After this the turnbuckle 42 may be properly adjusted for exerting the proper pull on the frame 20 to maintain the material 35 taut.

The device illustrated in Figs. 4 to 6 inclusive is similar in many respects to that illustrated in Figs. 1 to 3 inclusive. In the modified form, however, two frames generally designated by the numerals 50 and 51 have pivotal connections respectively at 52 and 53 with the base member 54 and these frames also have pivotal connections with the base member 55 as shown at 56 and 57. These base members are similar in all respects to the base members 10 shown in Figs. 1 to 3 inclusive. The legs 58 of each frame are shorter than the other legs 59 of said frames so that the bight portions 60 and 61 of the respective frames 50 and 51 are inclined at an angle to the horizontal.

A rod 62 has one end secured to the base member 54 by means of a cap nut 63 with a shoulder 65 abutting the inner face of the base member 54. The opposite end of the rod is also provided with a shoulder 66 abutting the inner face of the base member 55 with a cap nut 67 screwed onto the outer threaded end of the rod for drawing the base member tight against the shoulder 66.

Since the rod 68 is similar in construction and is connected to the base members in the same manner as is the rod 62, no description will be given of such connections and therefore the same reference numerals are applied to such connection.

Each of the rods 62 and 68 are provided with a notched or grooved portion 70 to receive a hook 71 on the end of a rod 72. A rod 73 is also provided with a hook 74 to engage over the bight portion of each frame 50 and 51. These hooks pass through a slot 75 in a piece of canvas or fabricated material 76. Since the turnbuckle for connecting and adjusting the rods 72 and 73 towards or away from each other is identical in construction to that shown in Figs. 1 to 3 inclusive as is the protective turnbuckle, the same reference numerals are applied to the various parts of the two turnbuckles as has been applied to the same elements in Figs. 1 to 3.

It will be noted that the pivotal connections 52, 53, 56 and 57 for the ends of the legs of the frames 50 and 51 are located inwardly of the connections between the rods 62 and the base members 54 and 55 so that when the turnbuckles 42 are properly adjusted the bight portion 60 and 61 of the respective frames 50 and 51 are pulled outwardly for maintaining the material 76 taut. In this particular construction it will be noted that the edge 77 of the material which is located adjacent the neck of the person resting his head upon the material is free of any metallic part. However, the legs 58 are slightly longer than the legs 29 as shown in Fig. 1.

While I have shown two forms of the device which may be used as a head-rest, nevertheless by making the base members sufficiently long and the frames stouter than that necessary for a head-rest, a cot may be evolved which will support the body of a person and which may be readily assembled or disassembled in the same manner as the head-rest.

When the support shown in Figs. 4 to 6 inclusive is collapsed after the turnbuckles 42 have been rotated sufficiently to release the hooks 71 from the bars 62 and 68, the frames 50 and 51 will lie within the base members 54 and 55 and rest in superimposed relation on the horizontal flanges of said base members with the fabric 76 overlapping the bight portions of the frames. It will be seen that a small and compact package will be provided which may be readily assembled into an operative position by the proper application of the turnbuckles and the attached rods.

The hooks 44 in Figs. 1 to 3 inclusive and the hooks 74 in Figs. 4 to 6 inclusive are not released when the support is collapsed since they are curved sufficiently around the respective bight portions of the frames to retain said hooks thereon. Thus the hooks 44 and 74 serve to retain the turnbuckles and the associated rods on the support when said support is collapsed.

I claim:

1. A head-rest comprising a pair of spaced base members, a rod connected to each pair of ends of the base members to form a unit, a bearing at each end of the base member and disposed inwardly of the rods, a U-shaped frame located adjacent each rod and having pintles on the free ends of the legs received by the contiguous bearings, a strip of fabricated material having its ends connected to the bight portions of the frames, said bight portions forming supports for the material at each side of the head rest, and removable means connected between said bight portions and the adjacently disposed rods for tilting said frames outwardly and for drawing the material taut, one of the legs of each frame being shorter than the other leg for causing the taut material to be inclined to the horizontal, the lower edge of the taut material being free of rigid elements so that when the head is placed upon the material the head and neck of the person using the head rest will be freely supported by the material only.

2. A collapsible head rest comprising a base member, a pair of spaced frames pivoted on said base member and rising therefrom, a strip of fabric connected between the tops of the frames, a rod adjacent one frame and having one end connected with the top of the associated frame, a second rod in line with the first rod and having connection at one end with the base member, a turnbuckle, the other ends of the rods being threaded into said turnbuckle for causing the top of the associated frame to be drawn outwardly for pulling the fabric taut, means for retaining the other frame against movement, each rod having a shoulder thereon near an end of the turnbuckle, a second turnbuckle, rods extending from the opposite ends of the second turnbuckle and provided with bearings coacting with the shoulders on the first-mentioned rods to prevent total disengagement of said first-mentioned rods from the associated turnbuckle.

3. A head-rest comprising a pair of spaced base members, a rod connected to each pair of ends of the base members to form a unit, a bearing at each end of each base member and at one side of the ends of the rods, a U-shaped frame located adjacent each rod and having pintles on the free ends of the legs received by contiguous bearings, the legs of one frame being longer than the legs of the other frame, a strip of fabricated material having the ends connected to the bight portions of the frames, and means connected between one of the rods and the bight portion of the adjacently disposed frame having the longer legs for pulling on said bight portions and for drawing the material taut, the legs of the other frame being adapted to be held in a tilted position by the adjacently disposed rod when the material is drawn taut.

CHARLES A. COMPTON.